(12) United States Patent
Bae

(10) Patent No.: US 8,233,106 B2
(45) Date of Patent: Jul. 31, 2012

(54) LIQUID CRYSTAL DISPLAY DEVICE

(75) Inventor: Moon Kyo Bae, Jinhae-si (KR)

(73) Assignee: LG Display Co., Ltd., Seoul (KR)

( * ) Notice: Subject to any disclaimer, the term of this patent is extended or adjusted under 35 U.S.C. 154(b) by 977 days.

(21) Appl. No.: 11/418,562

(22) Filed: May 4, 2006

(65) Prior Publication Data

US 2007/0076139 A1    Apr. 5, 2007

(30) Foreign Application Priority Data

Sep. 30, 2005  (KR) .................. 10-2005-0092324

(51) Int. Cl.
*G02F 1/1333*  (2006.01)
*G02F 1/1335*  (2006.01)

(52) U.S. Cl. ............................. 349/58; 349/65

(58) Field of Classification Search .......... 349/58, 349/61, 65
See application file for complete search history.

(56) References Cited

U.S. PATENT DOCUMENTS 6,741,299 B2 *  5/2004  Fukayama et al. ............. 349/58
6,876,409 B2 *  4/2005  Park et al. ..................... 349/58

* cited by examiner

*Primary Examiner* — Richard Kim
*Assistant Examiner* — David Chung
(74) *Attorney, Agent, or Firm* — Brinks Hofer Gilson & Lione

(57) ABSTRACT

A liquid crystal display device is provided that includes a liquid crystal panel, a guide panel, a top case, and first and second brackets. The guide panel supports the liquid crystal panel and has one or more fixing protrusions on the side surfaces thereof. The top case covers the liquid crystal panel and the guide panel and has one or more holes facing the protrusions of the guide panel. The first and second brackets are attached respectively onto both sides of the top case and have one or more fixing grooves facing the corresponding holes of the top case.

15 Claims, 6 Drawing Sheets

LIQUID CRYSTAL DISPLAY DEVICE

The present invention claims the benefit of Korean Patent Application No. 92324/2005, filed in Korea on Sep. 30, 2005, which is hereby incorporated by reference.

BACKGROUND

The present disclosure relates to a liquid crystal display ("LCD") device, and specifically, to an LCD with an improved assembly between a liquid crystal module and a system case.

DESCRIPTION OF THE RELATED ART

A cathode ray tube ("CRT") has been widely used as a monitor for a television ("TV"), a measuring instrument, an information terminal, and other devices. However, the CRT is heavy and large, and is inadequate for implementing a miniaturized and lightweight electronic product.

When compared to the CRT, a liquid crystal display device (LCD) is lighter, thinner, generally smaller in size and consumes a smaller amount of power. Particularly, a Thin Film transistor ("TFT") LCD can provide a high-quality image, a large screen and a color image that are comparable to those of the CRT, and thus is widely used in various technical fields such as the technical field of a notebook PC monitor.

An LCD includes a liquid crystal panel for displaying an image, a driving circuit for driving the liquid crystal panel, and a backlight assembly for providing light. All these components are stacked on a main support and assembled into a liquid crystal module. An LCD, such as for a notebook PC monitor, is manufactured by assembling the liquid crystal module to a system case of a predetermined shape.

FIG. 1 is an exploded perspective view of a related art LCD in which a liquid crystal module is assembled to a system case. FIG. 2 is a sectional view of a related art LCD taken along a line I-I' of FIG. 1.

Referring to FIGS. 1 and 2, the related art LCD includes a liquid crystal module 10, first and second brackets 90 and 91 respectively attached onto both sides of the liquid crystal module 10, and a system case 92 attached onto a lower surface of the liquid crystal module 10.

As in FIG. 2, the liquid crystal module 10 includes a liquid crystal panel 50 displaying an image, a backlight assembly 30 providing light to the liquid crystal panel 50, a guide panel 40 supporting the liquid crystal panel 50 and receiving the backlight assembly 30, a top case 20 fixing the liquid crystal panel 50, and a bottom case 60 supporting the backlight assembly 30. The backlight assembly 30 includes a reflection plate 31, a light guide plate 32, a light source 34, a light source housing 35, and an optical sheet unit 33.

A plurality of first case pin grooves 75 for receiving first pins 100 are formed at one side of the top case 20 corresponding to the first bracket 90, while being spaced apart from one another by a predetermined distance. First screw grooves 81 for receiving screws 88 are located in both edge regions of one side of the top case 20.

First bracket pin grooves 70 corresponding to the first case pin grooves 75 and first screw holes 82 corresponding to the first screw grooves 81 are formed in the first bracket 90 to be attached to one side of the top case 20. Likewise, a plurality of second case pin grooves 76 for receiving second pins 101 are formed at the other side of the top case 20 corresponding to the second bracket 91, while being spaced apart from one another by a predetermined distance. Second screw grooves (not illustrated) for receiving screws 88 are formed in both edge regions of the other side of the top case 20. Second bracket pin grooves 71 corresponding to the second case pin grooves 76 and second screw holes 83 corresponding to the second screw grooves are formed in the second bracket 91 to be attached to the other side of the top case 20.

Accordingly, one end of the first pin 100 is inserted and clipped into the corresponding first case pin groove 75 of the top case 20, and the other end of the first pin 100 is inserted and clipped into the corresponding second bracket pin groove 70 of the first bracket 90. Likewise, one end of the second pin 101 is inserted and clipped into the corresponding second case pin groove 76 of the top case 20, and the other end of the second pin 101 is inserted and clipped into the corresponding second bracket pin groove 71 of the second bracket 91.

The screw 88 corresponding to the first bracket 90 is attached to the first screw groove 81 of the top case 20 through the first screw hole 82 of the first bracket 90. Likewise, the screw 88 corresponding to the second bracket 91 is attached to the second screw groove of the top case 20 through the second screw hole 83 of the second bracket 91.

In the related art LCD of FIG. 1 and FIG. 2, a predetermined clearance exists between the first pin 100 and the inner wall surface of the first case pin groove 75 and between the second pin 101 and the inner wall surface of the second case pin groove 76 so that the first and second pins 100 and 101 can be easily inserted into the first and second case pin grooves 75 and 76, respectively. However, due to an external force during the attaching of the first and second brackets 90 and 91, this predetermined clearance may cause damage to the first and second pins 100 and 101. Accordingly, the first and second screw holes 82 and 83 may be misaligned with respect to the corresponding screw grooves, making the attachment of the screws difficult.

Since the top case 20 formed to surround the edge of the liquid crystal panel 50 is weak in strength, it may be distorted by an external force during the attachment of the first and second brackets 90 and 91. This distortion causes a damage defect due to friction between the components of the liquid crystal module 10.

SUMMARY

In a first aspect, a liquid crystal display device is provided including a liquid crystal panel. A guide panel supports the liquid crystal panel and has at least one protrusion on at least one side surface of the guide panel. A top case covers the liquid crystal panel and the guide panel and has at least one hole facing the at least one protrusion of the guide panel. A first bracket is attached onto at least one side of the top case and has at least one groove facing the at least one hole of the top case.

In another aspect of the present disclosure, a liquid crystal display device includes a liquid crystal panel. A guide panel supports the liquid crystal panel and has at least one groove on at least one side surface of the guide panel. A top case covers the liquid crystal panel and the guide panel and has at least one hole facing the at least one groove on the at least one side surface of the guide panel. A first bracket is attached onto at least one side of the top case and has at least one protrusion facing the at least one hole of the top case.

In another aspect of the present disclosure, a liquid crystal display device includes a liquid crystal panel and a guide panel supporting the liquid crystal panel. A top case covers the liquid crystal panel and the guide panel. A first bracket is also included, and a first side of the guide panel is configured to be attached directly into the first bracket through a protrusion located on the first side of the guide panel and a groove located on the first bracket.

In another aspect of the present disclosure, a liquid crystal display device includes a liquid crystal panel and a guide panel supporting the liquid crystal panel. A top case covers the liquid crystal panel and the guide panel. A first bracket is also included. A first side of the guide panel is configured to be attached directly into the first bracket through a protrusion located on the first bracket and a groove located on the first side of the guide panel.

In another aspect of the present disclosure, a liquid crystal display device includes a liquid crystal panel and a guide panel supporting the liquid crystal panel. A first side of the guide panel has a protrusion. A top case covers the liquid crystal panel and the guide panel. An upper bracket and a lower bracket are included. The lower bracket is configured to be combined with the upper bracket, such that the combined upper bracket and lower bracket form a groove configured to receive the protrusion from the first side of the guide panel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated into and constitute a part of this application, illustrate embodiment(s) of the invention and together with the description serve to explain the principle of the invention. In the drawings.

DETAILED DESCRIPTION

Reference will now be made in detail to the embodiments of the present disclosure, examples of which are illustrated in the accompanying drawings. Wherever possible, the same reference numbers will be used throughout the drawings to refer to the same or like parts.

Figure 3:
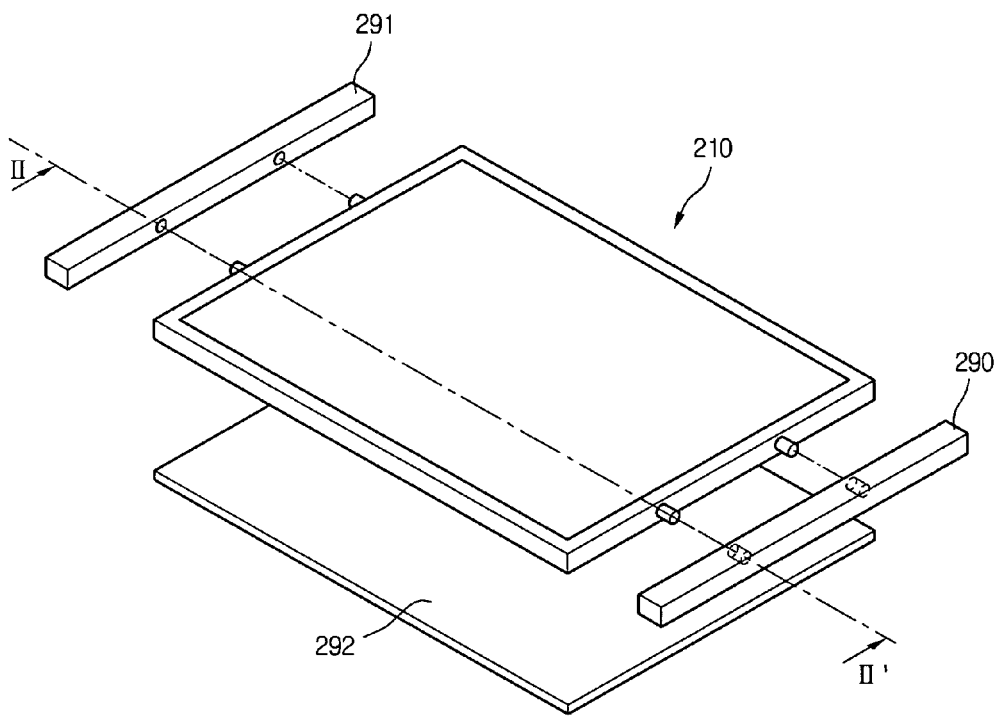
FIG. 3 is an exploded perspective view of an LCD in which a liquid crystal module is assembled onto a system case according to a first embodiment.
Figure 4:
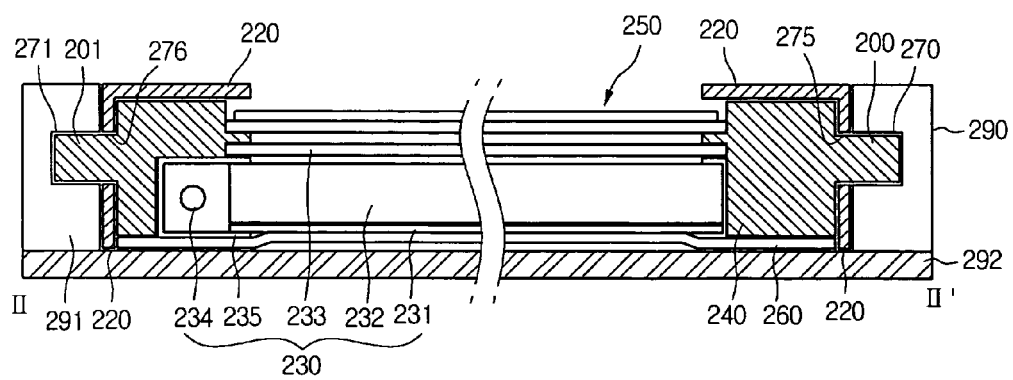
FIG. 4 is a sectional view taken along a line II-II' of FIG. 3.

FIG. 3 is an exploded perspective view of an LCD in which a liquid crystal module is assembled onto a system case according to a first embodiment of the present invention. FIG. 4 is a sectional view taken along a line II-II' of FIG. 3.

Referring to FIG. 3, the LCD includes a liquid crystal module 210, first and second brackets 290 and 291 respectively attached onto both sides of the liquid crystal module 210, and a system case 292 attached onto a lower surface of the liquid crystal module 210.

Referring to both FIGS. 3 and 4, the liquid crystal module 210 includes a liquid crystal panel 250 displaying an image, a backlight assembly 230 providing light to the liquid crystal panel 250, a guide panel 240 supporting the liquid crystal panel 250 and receiving the backlight assembly 230, a top case 220 shaped to stabalize the liquid crystal panel 250 and to surround the edge of the guide panel 240, and a bottom case 260 supporting the backlight assembly 230.

The backlight assembly 230 includes a reflection plate 231 disposed inside of the bottom case 260 to reflect light, a light guide plate 232 disposed on the reflection plate 231 to convert line light into surface light, a light source 234 disposed on a side surface of the light guide plate 232 to generate light, and an optical sheet unit 233 disposed on the light guide plate 232 to diffuse and condense light. The backlight assembly 230 further includes a light source housing 235 disposed to surround and protect the light source 234.

A plurality of first fixing grooves 270 are formed on a surface of the first bracket 290 adjacent to one side of the top case 220. The first fixing grooves 270 are spaced apart from one another by a predetermined distance. Likewise, a plurality of second fixing grooves 271 are formed on a surface of the second bracket 291 adjacent to the other side of the top case 220. The second fixing grooves 271 are spaced apart from one another by a predetermined distance.

A plurality of first holes 275 are formed on the side of the top case 220 corresponding to the first fixing grooves 270. The first holes 275 are spaced apart from one another by a predetermined distance. Likewise, a plurality of second holes 276 are formed on the other side of the top case 220 corresponding to the second fixing grooves 271. The second holes 276 are spaced apart from one another by a predetermined distance.

At the guide panel 240, first fixing protrusions 200 are formed to correspond with the first holes 275 and second fixing protrusions 201 are formed to correspond with the second holes 276. The first and second fixing protrusions 200 and 201 are formed from the body of the guide panel 240, and the first and second holes 275 and 276 are formed from the body of the top case 220. The first and second fixing protrusions 200 and 201 are shaped to protrude outward from the both sides of the guide panel 240. The guide panel 240 includes a top surface parallel to the top case 220 and a bottom surface parallel to the bottom case 260. The sides are adjacent to the top surface and adjacent to the bottom surface and correspond with the surface of the guide panel facing the bracket. Therefore, the protrusions and holes can be formed without using an additional component.

In an alternate embodiment, there may be one bracket that covers all four sides of the guide panel. This one bracket may be referred to as a holding structure. There may be brackets corresponding to all the sides of the guide panel. Those brackets may all be combined to form the holding structure. For example, each side of the guide panel may include a bracket for securing the guide panel and those brackets may be combined as a holding structure.

The first fixing protrusion 200 is inserted into the first fixing groove 270 after passing through the first hole 275 of the first bracket 290. Likewise, the second fixing protrusion 201 is inserted into the second fixing groove 271 after passing through the second hole 276 of the second bracket 291. The first and second fixing grooves 270 and 271 have a groove structure with one end is closed. Alternatively, the first and second fixing grooves 270 and 271 may have a hole structure with both ends are opened. Thereafter, the first and second brackets 290 and 291 are attached to the system case 292 to complete the LCD assembly. The system case 292 may be attached to the first and second brackets 290 and 291 using an adhesive or screws.

As mentioned above, the LCD according to a first embodiment is assembled using the first and second fixing protrusions 200 and 201 respectively passing through the first and second holes 275 and 276. Therefore, the assemblage strength between the top case 220 and the guide panel 240 can be enhanced to reduce distortion.

Figure 5:
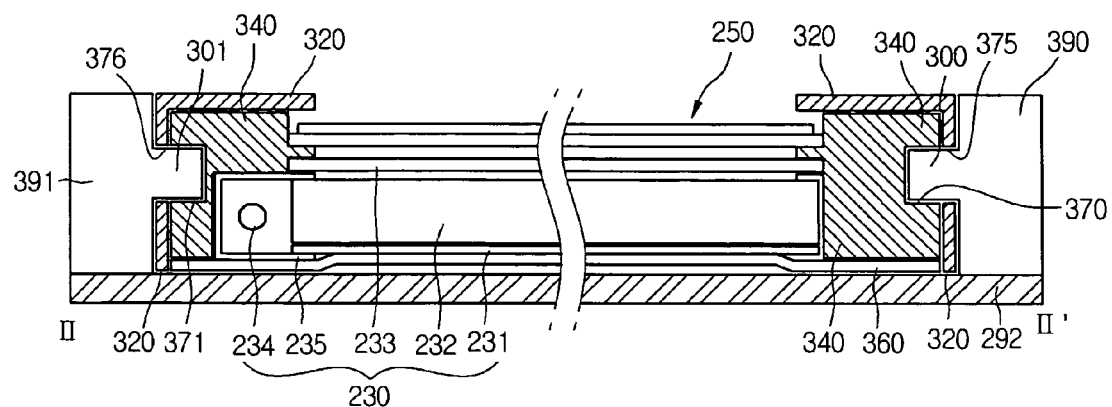
FIG. 5 is a sectional view of an LCD according to a second embodiment.

FIG. 5 is a sectional view of an LCD according to a second embodiment. All components of the LCD according to a second embodiment are similar to the LCD of the first embodiment, except first and second brackets 390 and 391 and a guide panel 340. Accordingly, the description of the similar components will be omitted for conciseness.

Referring to FIG. 5, a top case is provided with first and second holes 375 and 376. The first bracket 390 is provided with a first fixing protrusion 300 corresponding to the first hole 375, and the second bracket 391 is provided with a second fixing protrusion 301 corresponding to the second hole 376. A first fixing groove 370 is formed on one side of the guide panel 340 corresponding to the first hole 375, and a second fixing groove 371 is formed on the other side of the guide panel 340 corresponding to the second hole 376.

The first and second fixing protrusions 300 and 301 are formed in the body of the first and second brackets 390 and 301. The first and second holes 375 and 376 are formed in the body of the top case 320. Therefore, the protrusions and holes can be formed without using an additional component. The first and second fixing grooves 370 and 371 may be formed during the process of fabricating the guide panel 340.

The first fixing protrusion 300 of the first bracket 390 is inserted into the first fixing groove 370 of the guide panel 340 after passing through the first hole 375 of the top case 320. Likewise, the second fixing protrusion 301 of the second bracket 391 is inserted into the second fixing groove 371 of the guide panel 340 after passing through the second hole 376 of the top case 320. Thereafter, the liquid crystal module 210, the first and second brackets 390 and 391, and the system case 292 are assembled to complete the LCD assembly.

Figure 1:
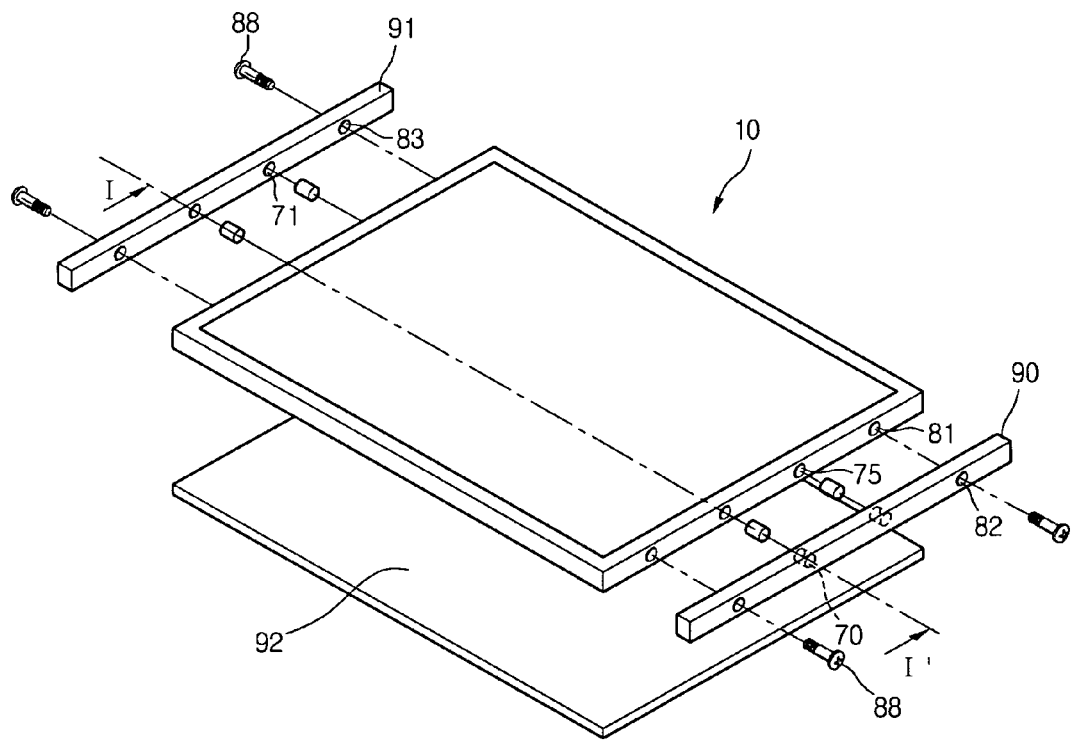
FIG. 1 is an exploded perspective view of a related art LCD in which a liquid crystal module is assembled to a system case.
Figure 2:
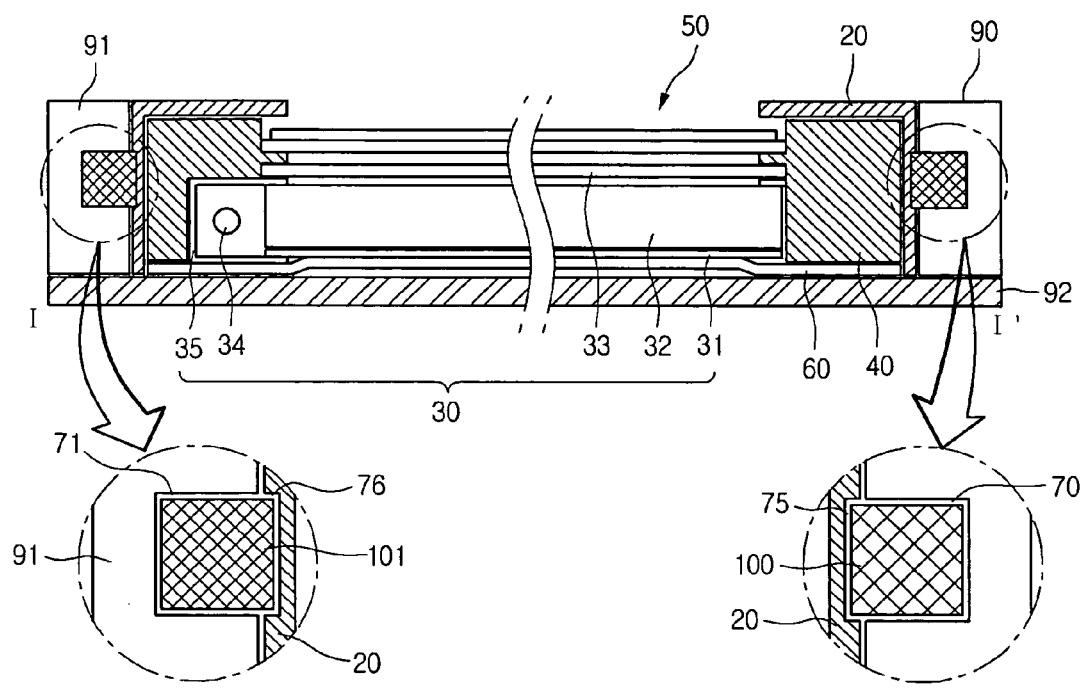
FIG. 2 is a sectional view of a related art LCD taken along a line I-I' of FIG. 1.

As mentioned above, since the first and second fixing protrusions 300 and 301, respectively, formed in the body of the first and second brackets 390 and 391 respectively pass through the first and second holes 375 and 376 and are respectively inserted into the first and second fixing grooves 370 and 371, screws can be omitted, such as screws 88 in FIG. 1. Accordingly, the component cost can be reduced and the efficiency of the assembly can be enhanced.

As described above, the fixing protrusions are formed at the guide panel, the holes are formed at the top case, and the fixing grooves are formed at the system case. Accordingly, distortion of the top case can be reduced. In an alternate embodiment, the fixing protrusions are formed at the system case, the holes are formed at the top case, and the fixing grooves are formed at the guide panel.

It will be apparent to those skilled in the art that various modifications and variations can be made in the present embodiments. Thus, it is intended that the present embodiments covers the modifications and variations of this invention provided they come within the scope of the appended claims and their equivalents.

Figure 6:
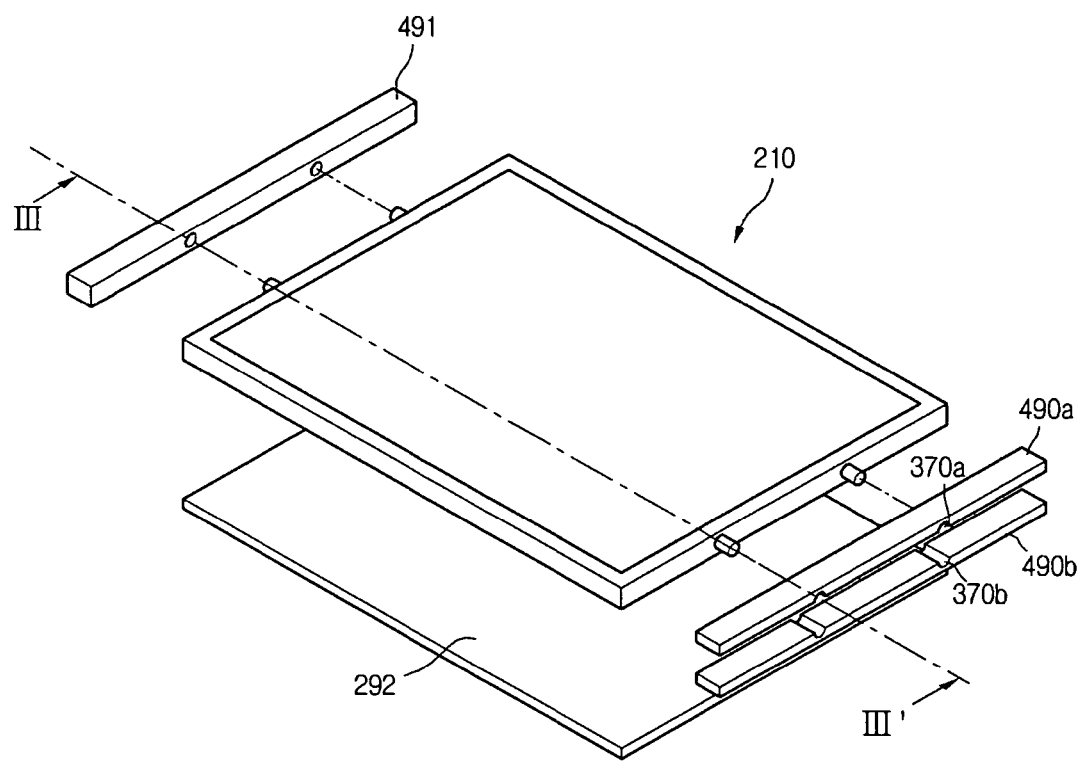
FIG. 6 is an exploded perspective view of an LCD according to a third embodiment.
Figure 7:
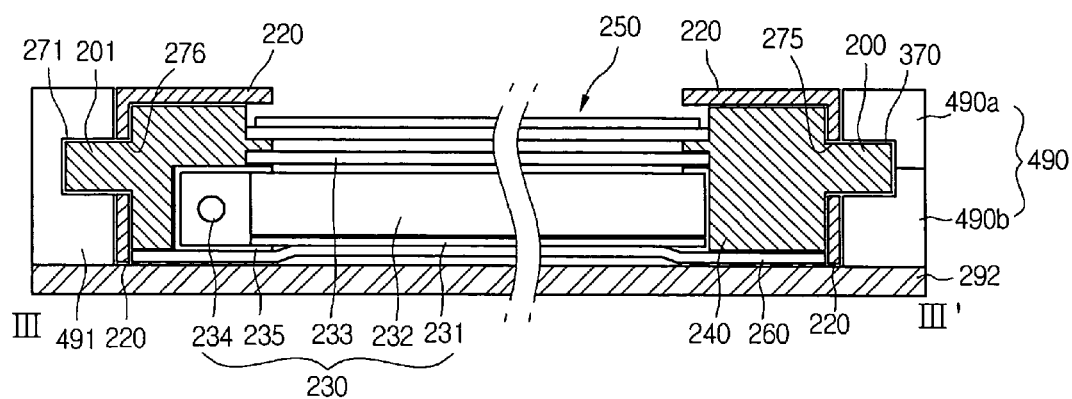
FIG. 7 is a sectional view of an LCD according to a third embodiment.

FIG. 6 is an exploded perspective view of an LCD according to a third embodiment. FIG. 7 is a sectional view taken along a line III-III' of FIG. 6. Referring to FIGS. 6 and 7 the LCD according to the third embodiment has the same components as those of the second embodiment illustrated in FIG. 4 except for the first bracket 490. A description of the similar components will be omitted for conciseness.

Unlike the first bracket 290 of FIG. 4, the first bracket 490 includes an upper bracket 490a and a lower bracket 490b. Also, a plurality of upper fixing grooves 370a spaced apart from one another by a predetermined distance are formed in the upper bracket 490a. Likewise, a plurality of lower fixing grooves 370b corresponding to the upper fixing grooves 370a are formed in the lower bracket 490b.

A first fixing protrusion 200 of the guide panel 240 is fixed to the upper and lower fixing grooves 370a and 370b in a manner in which the fixing grooves 370a and 370b face one another. That is, while the upper and lower brackets 490a and 490b are assembled together, the upper and lower fixing grooves 370a and 370b are combined to form a first fixing groove 370. A first fixing protrusion 200 is fixed to the inside of the first fixing groove 370 as in FIG. 7.

Accordingly, the second bracket 491 and the guide panel 240 are assembled together. Also, the lower and upper brackets 490a and 490b are assembled into the bracket 490 by using screws (not shown) to combine the two brackets, thereby facilitating the assembly. In alternate embodiments, the lower and upper brackets 490a and 490b may be combined with other fixing means.

In the above embodiment, the first bracket 490 is divided into the upper and lower brackets and the second bracket 491 is not divided. Alternatively, the second bracket 491 may be divided into an upper and lower bracket. In addition, both of the first and second brackets 490 and 491 could be divided for the assembly of the LCD.

What is claimed is:

1. A liquid crystal display device comprising:
a liquid crystal panel;
a guide panel supporting the liquid crystal panel and receiving a backlight assembly, the guide panel having an inner side immediately adjacent to the liquid crystal panel and the backlight assembly and having at least one protrusion formed thereon on a side opposite the inner side;
a top case covering the liquid crystal panel and the guide panel, the top case having at least one hole corresponding with the at least one protrusion of the guide panel;
a bottom case supporting the backlight assembly and covering at least part of the guide panel, wherein the top case and bottom case substantially cover the guide panel; and
a first bracket attached onto at least one side of the top case and having at least one groove corresponding with the at least one hole of the top case,
wherein the at least one protrusion is located on one side surface of the guide panel,
wherein the at least one protrusion respectively protrudes outward from the side surface of the guide panel, and is formed from the guide panel,
wherein the at least one protrusion of the guide panel is inserted into the grooves of the first bracket through the corresponding holes of the top case.

2. The liquid crystal display device according to claim 1, wherein at least one of the at least one protrusion is located on a side surface opposite one of the at least one side surface of the guide panel.

3. The liquid crystal display device according to claim 2, wherein a second bracket is attached onto the opposing side surface of the guide panel.

4. The liquid crystal display device according to claim 1, wherein a second bracket, a third bracket and a fourth bracket are attached onto the each of the at least one side surfaces of the guide panel.

5. The liquid crystal display device according to claim 4, wherein the first bracket, the second bracket, the third bracket, and the fourth bracket combine to form a holding structure.

6. The liquid crystal display device according to claim 5, wherein the holding structure covers each of the at least one side surfaces of the guide panel.

7. The liquid crystal display device according to claim 5, wherein the holding structure is divided into an upper holding structure and a lower holding structure.

8. The liquid crystal display device according to claim 1, wherein each of the at least one protrusion corresponds to one of the at least one groove and corresponds to one of the at least one hole.

9. A liquid crystal display device comprising:
  a liquid crystal panel;
  a guide panel supporting the liquid crystal panel and receiving a backlight assembly, the guide panel having an inner side immediately adjacent to the liquid crystal panel and the backlight assembly and having at least one protrusion formed thereon on a side opposite the inner side;
  a top case covering the liquid crystal panel and the guide panel;
  a bottom case supporting the backlight assembly and covering at least part of the guide panel, wherein the top case and bottom case substantially cover the guide panel; and
  a first bracket, wherein the at least one protrusion of a first side of the guide panel is configured to be attached directly into the first bracket through a groove defined partway within the first bracket along a longitudinal axis parallel to the at least one protrusion,
  wherein the first side of guide panel attaches to the first bracket through a hole in the top case.

10. The liquid crystal display device according to claim 9 further comprising a second bracket, wherein a protrusion located on a second side of the guide panel is configured to be attached directly into the second bracket through a groove defined partway within the second bracket along a longitudinal axis parallel to the protrusion.

11. The liquid crystal display device according to claim 9, wherein the first bracket is configured to be attached to more than one side of the guide panel.

12. A liquid crystal display device comprising:
  a liquid crystal panel;
  a guide panel supporting the liquid crystal panel and receiving a backlight assembly, wherein a first side of the guide panel has a protrusion and a second side of the guide panel that is opposite to the first side is immediately adjacent to the liquid crystal panel and the backlight assembly;
  a top case covering the liquid crystal panel and the guide panel;
  a bottom case supporting the backlight assembly and covering at least part of the guide panel;
  an upper bracket; and
  a lower bracket configured to be combined with the upper bracket, wherein the combined upper bracket and lower bracket form a groove configured to receive the protrusion from the first side of the guide panel,
  wherein the protrusion is located on each side of the guide panel,
  wherein the protrusion of the guide panel is inserted into the grooves of the combined upper bracket and lower bracket.

13. The liquid crystal display device according to claim 12, wherein the combined upper bracket and lower bracket form grooves configured to receive the protrusions from each side of the guide panel.

14. The liquid crystal display device according to claim 12, wherein the combined upper bracket and lower bracket form grooves that pass partway through the upper and lower brackets along a longitudinal axis parallel to the protrusion.

15. The liquid crystal display device according to claim 1, wherein the at least one groove passes partway through the first bracket along a longitudinal axis parallel to the at least one protrusion.

* * * * *